(12) United States Patent
Koike

(10) Patent No.: US 10,241,388 B1
(45) Date of Patent: Mar. 26, 2019

(54) IMAGE READING APPARATUS AND IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Sho Koike, Shimizu Sunto Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 21 days.

(21) Appl. No.: 15/712,582

(22) Filed: Sep. 22, 2017

(51) Int. Cl.
| | | |
|---|---|---|
| H04N 1/04 | (2006.01) | |
| G03B 27/62 | (2006.01) | |
| H04N 1/107 | (2006.01) | |
| G03G 15/00 | (2006.01) | |
| G03G 15/01 | (2006.01) | |

(52) U.S. Cl.
CPC ......... *G03B 27/6228* (2013.01); *H04N 1/107* (2013.01); *G03G 15/0142* (2013.01); *G03G 15/60* (2013.01)

(58) Field of Classification Search
CPC .............. G03B 27/6228; H04N 1/107; G03G 15/0142; G03G 15/60
USPC ................ 358/497, 474, 505; 399/379, 380; 250/239
See application file for complete search history.

(56) References Cited

U.S. PATENT DOCUMENTS

| | | | | |
|---|---|---|---|---|
| 6,640,083 B2 * | 10/2003 | Conard-White | ..... | G03G 15/605 355/75 |
| 6,965,749 B2 * | 11/2005 | Lee | ....... | G03G 15/605 399/377 |
| 8,027,069 B2 * | 9/2011 | Momose | ............ | H04N 1/00554 358/471 |
| 8,195,082 B1 * | 6/2012 | King | ..... | G03G 15/605 399/374 |
| 8,605,300 B2 * | 12/2013 | Nagasgima | ........ | G03G 21/1633 358/1.1 |
| 2007/0292182 A1 * | 12/2007 | Liu | ....... | G03G 15/605 399/380 |

FOREIGN PATENT DOCUMENTS

| | | | | |
|---|---|---|---|---|
| DE | 3833371 A1 * | 4/1990 | ......... | G03G 27/6221 |
| JP | 09-81304 | 3/1997 | | |
| JP | 2005-31465 | 2/2005 | | |

\* cited by examiner

*Primary Examiner* — Cheukfan Lee
(74) *Attorney, Agent, or Firm* — Amin, Turocy & Watson LLP

(57) ABSTRACT

An image reading apparatus comprises a housing having a document table glass, a scanner section, a cover member, an adsorption board, a driving section and a controller. The cover member is connected to the housing to be rotatable around a first rotation center line with respect to the housing between a closed position where the document table glass is covered and an open position. The adsorption board, arranged in a part at a housing side at the time the cover member is positioned at the closed position, has an adsorption surface adsorbing the original document, and is connected to the cover member to be rotatable around a second rotation center line parallel to the first rotation center line. The driving section adsorbs the original document on the adsorption surface of the adsorption board.

6 Claims, 8 Drawing Sheets

IMAGE READING APPARATUS AND IMAGE FORMING APPARATUS

FIELD

Embodiments described herein relate generally to an image reading apparatus and an image forming apparatus.

BACKGROUND

An image reading apparatus has a housing with a document table glass, a scanner section in the housing, and a scanner cover connected to the housing. The scanner section reads an original document on the document table glass. The scanner cover rotates between a closed position covering a surface of the document table glass and an open position exposing the surface of the document table glass. The scanner cover has a pad opposite the document table glass if at the closed position. The pad presses the original document on the document table glass to the document table glass at the time the scanner cover is at the closed position.

DETAILED DESCRIPTION

In accordance with an embodiment, an image reading apparatus comprises a housing, a scanner section, a cover member, an adsorption board, a driving section and a controller. The housing has a document table glass. The scanner section arranged in the housing reads an original document on the document table glass. The cover member is connected to the housing to be rotatable around a first rotation center line with respect to the housing between a closed position where the document table glass is covered and an open position. The adsorption board, arranged in apart at a housing side at the time the cover member is positioned at the closed position, has an adsorption surface adsorbing the original document, and is connected to the cover member to be rotatable around a second rotation center line parallel to the first rotation center line between a clamping position at which the original document can be clamped between the adsorption surface and the document table glass at the time the cover member is positioned at the closed position and a movement position at which the adsorption surface moves in a direction away from the first rotation center line with respect to the clamping position. The driving section adsorbs the original document on the adsorption surface of the adsorption board. The controller controls the driving section.

Figure 1:
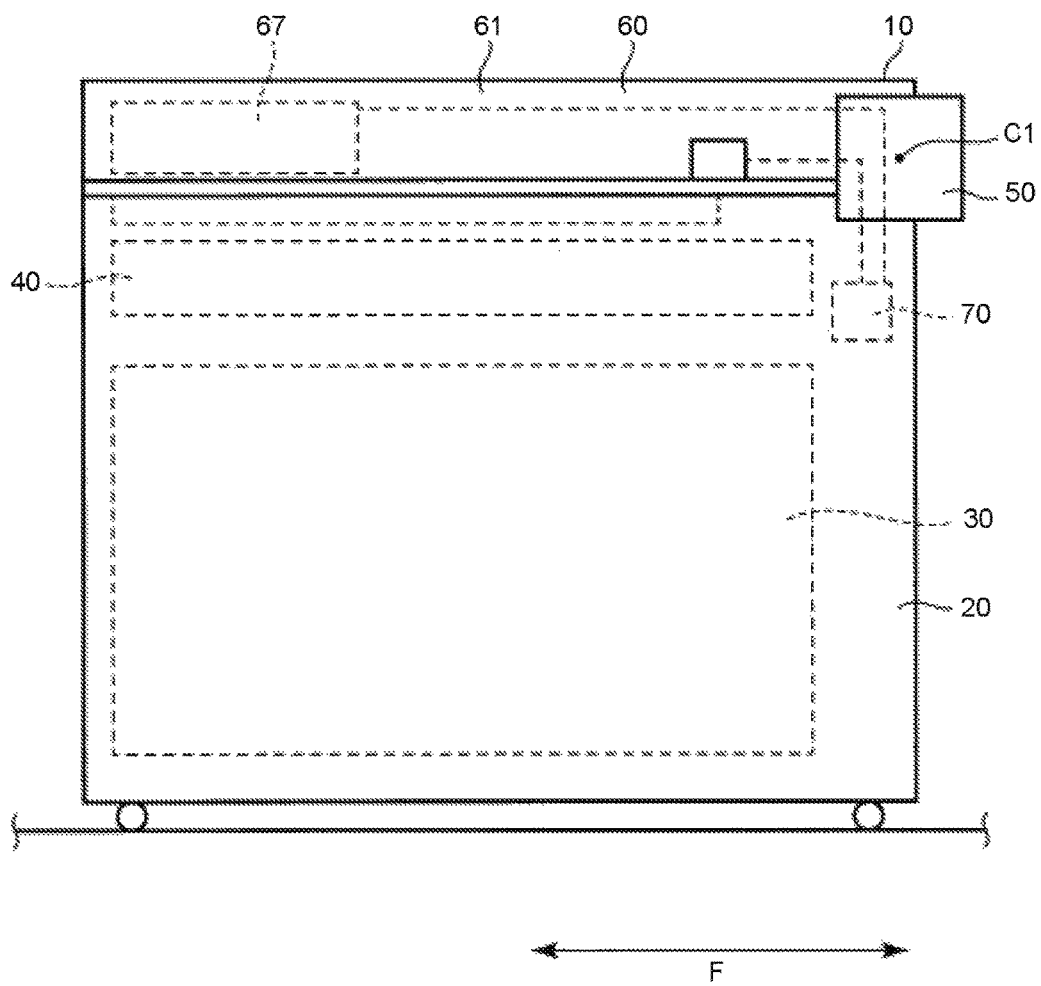
FIG. 1 is a side view of an image forming apparatus.
Figure 2:
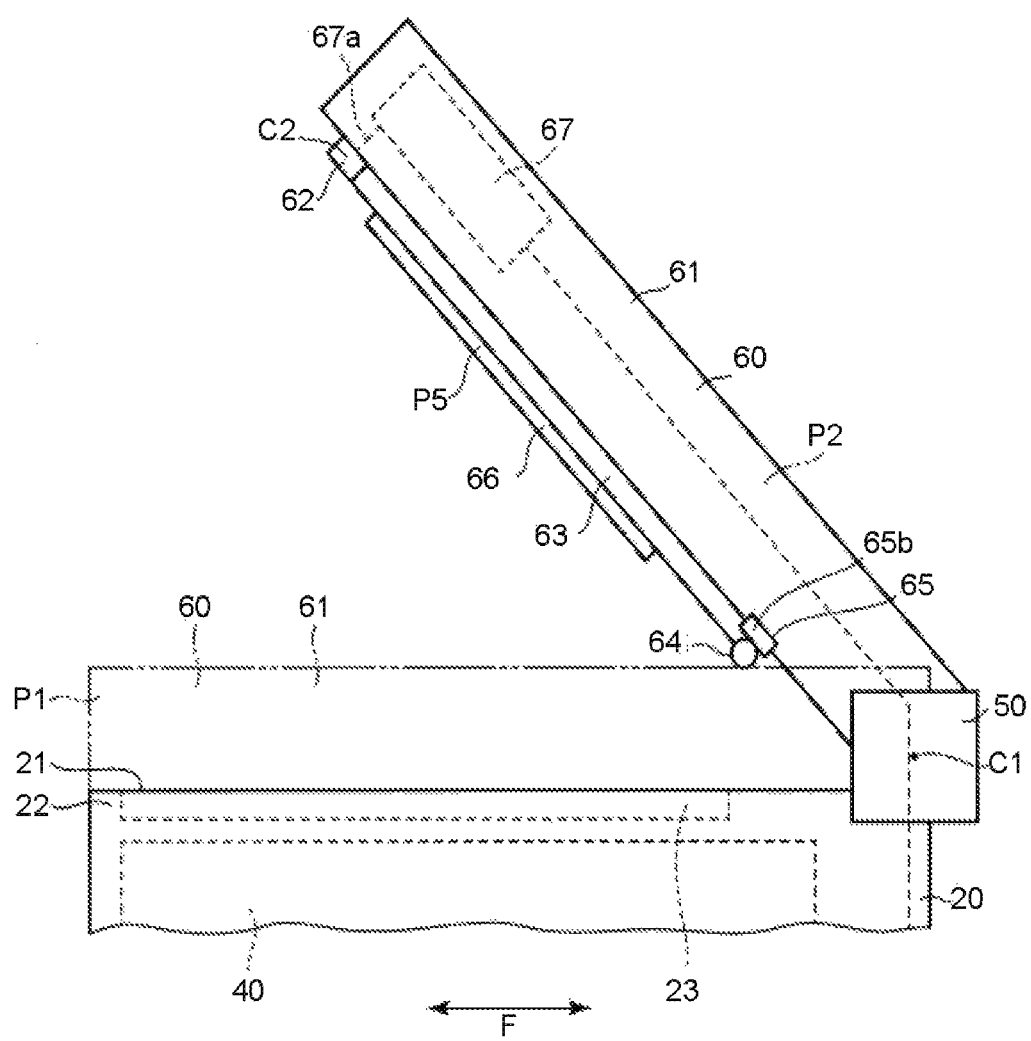
FIG. 2 is a side view illustrating an upper part of the image forming apparatus.
Figure 3:
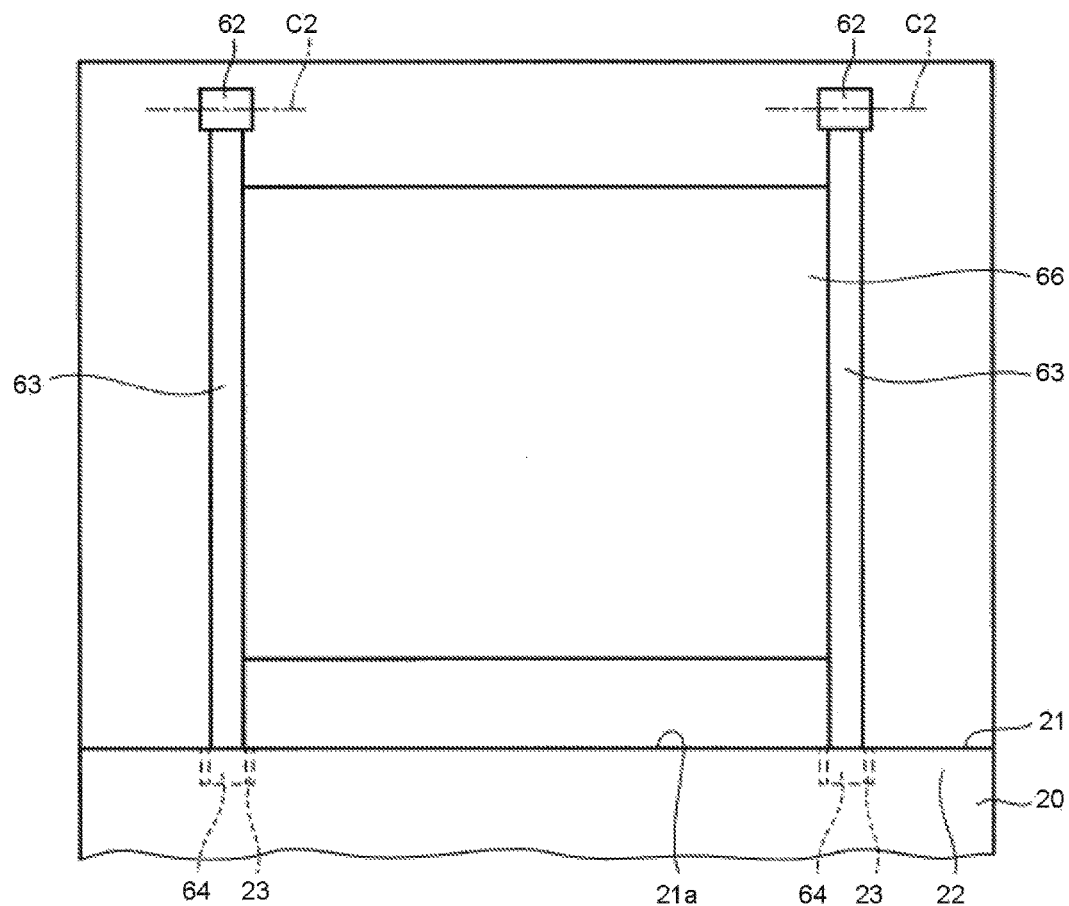
FIG. 3 is a front view illustrating the upper part of the image forming apparatus with the scanner cover open to an abutment position.

An image forming apparatus 10 according to an embodiment is described with reference to FIG. 1 to FIG. 9. FIG. 1 is a side view of the image forming apparatus 10. FIG. 2 is a side view illustrating the upper part of the image forming apparatus 10. FIG. 2 specifically shows a state in which a scanner cover 60 of the image forming apparatus 10 is open. FIG. 3 is a front view illustrating the upper part of the image forming apparatus 10 with the scanner cover 60 open to an abutment position P3.

Figure 4:
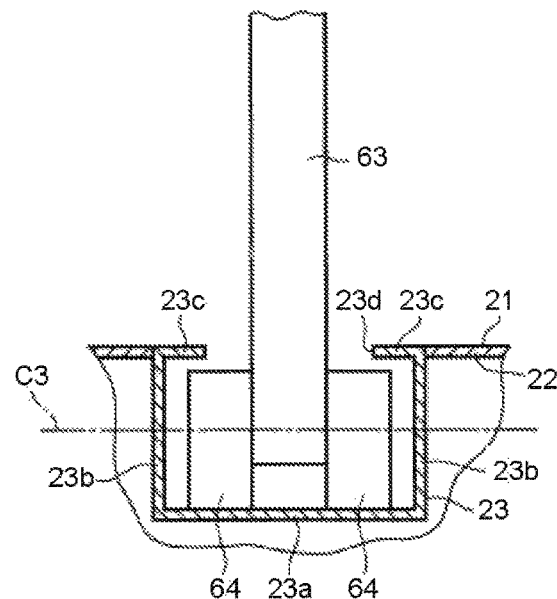
FIG. 4 is a cross-sectional view illustrating the main portions of the image forming apparatus with the scanner cover open.

FIG. 4 is a cross-sectional view illustrating the main portions of the image forming apparatus 10 with the scanner cover 60 open. FIG. 4 specifically shows a cross-sectional view obtained by cutting the vicinity of a slide rail 23 of a housing 20 of the image forming apparatus 10 with the scanner cover 60 open in a state in which a support section 63 is unlocked by a lock mechanism 65 described later along a cutting plane orthogonal to a longitudinal direction of the slide rail 23.

Figure 5:
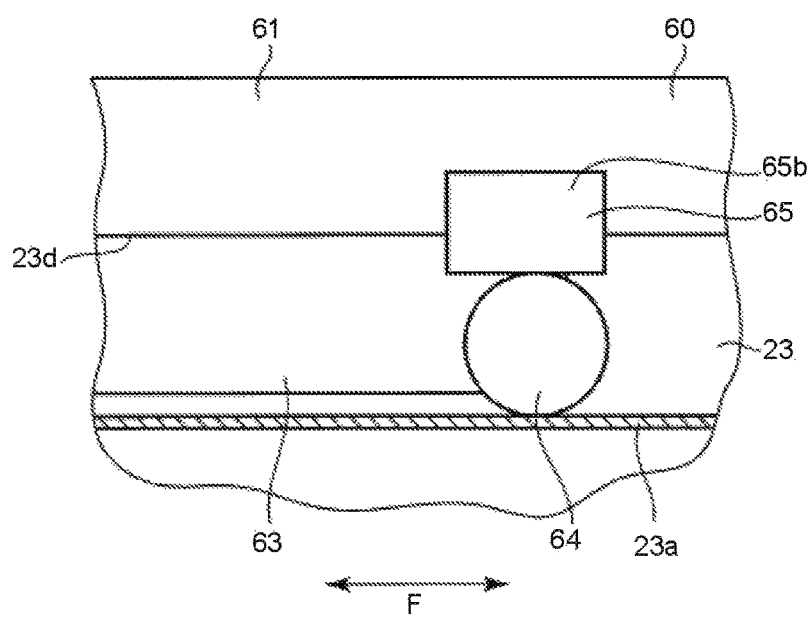
FIG. 5 is a cross-sectional view illustrating the main portions of the image forming apparatus with the scanner cover at a closed position.

FIG. 5 is a cross-sectional view illustrating the main portions of the image forming apparatus 10 with the scanner cover 60 at a closed position P1. FIG. 5 specifically shows a cross-sectional view obtained by cutting the vicinity of the slide rail 23 of the housing 20 of the image forming apparatus 10 in a state in which the support section 63 is locked by the lock mechanism 65 along a cutting plane along the longitudinal direction of the slide rail 23.

Figure 6:
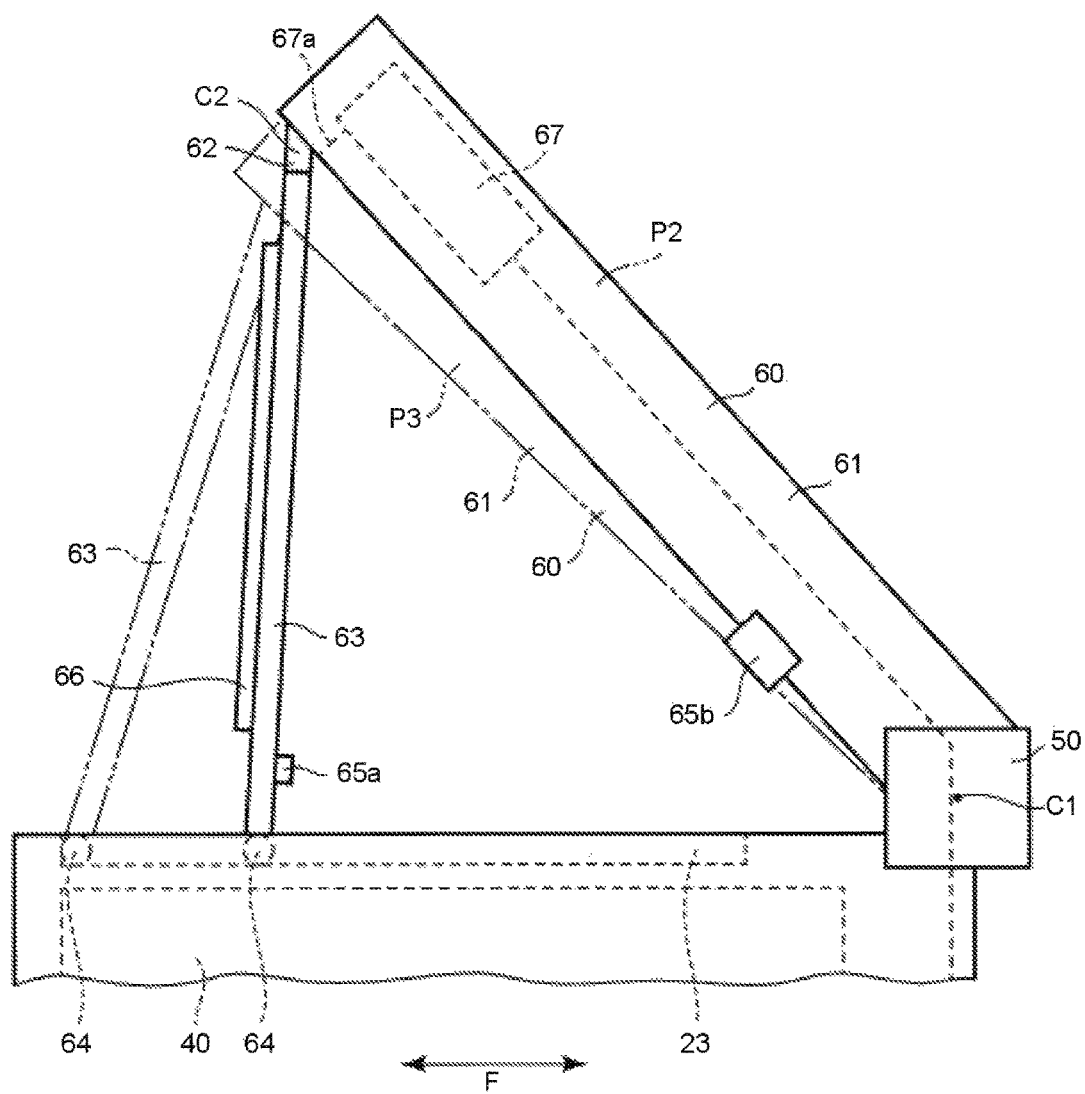
FIG. 6 is a side view illustrating the upper part of the image forming apparatus with the scanner cover open in a state in which a locking by a lock mechanism is released.
Figure 7:
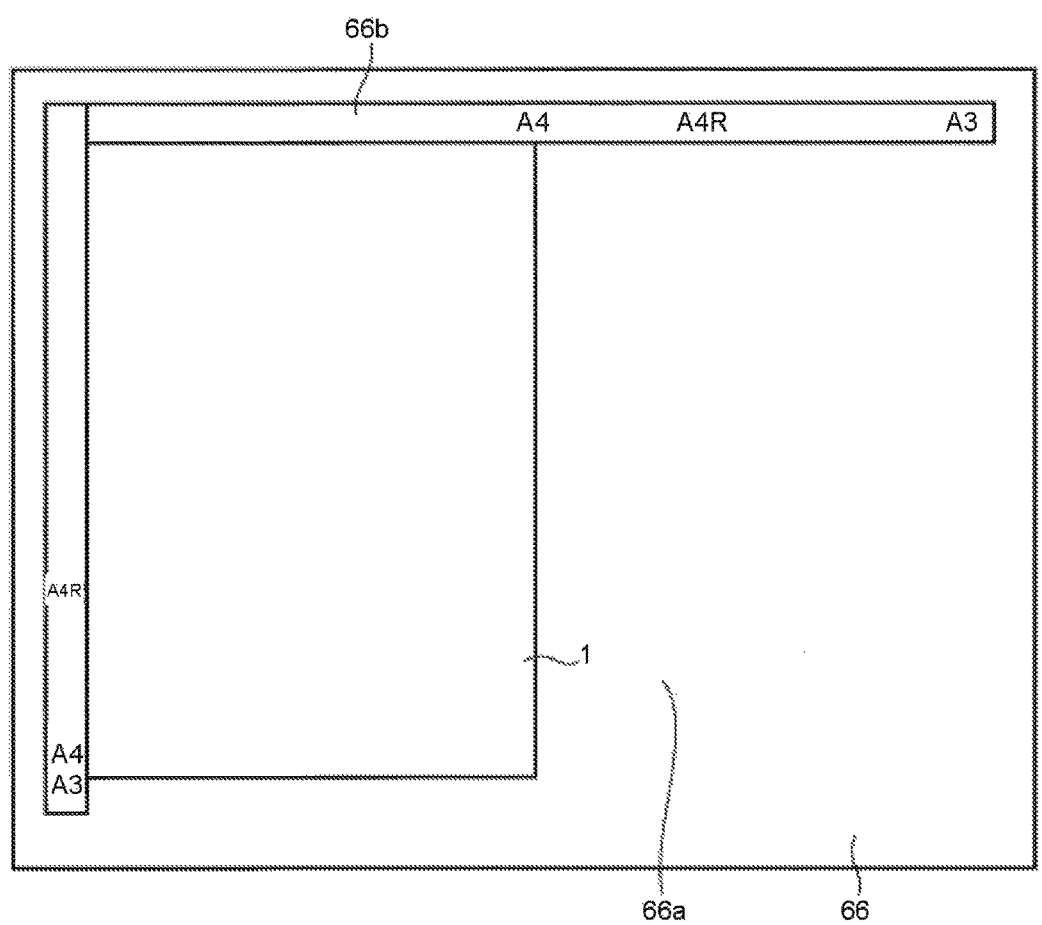
FIG. 7 is a front view illustrating an adsorption board adsorbing an original document.
Figure 8:
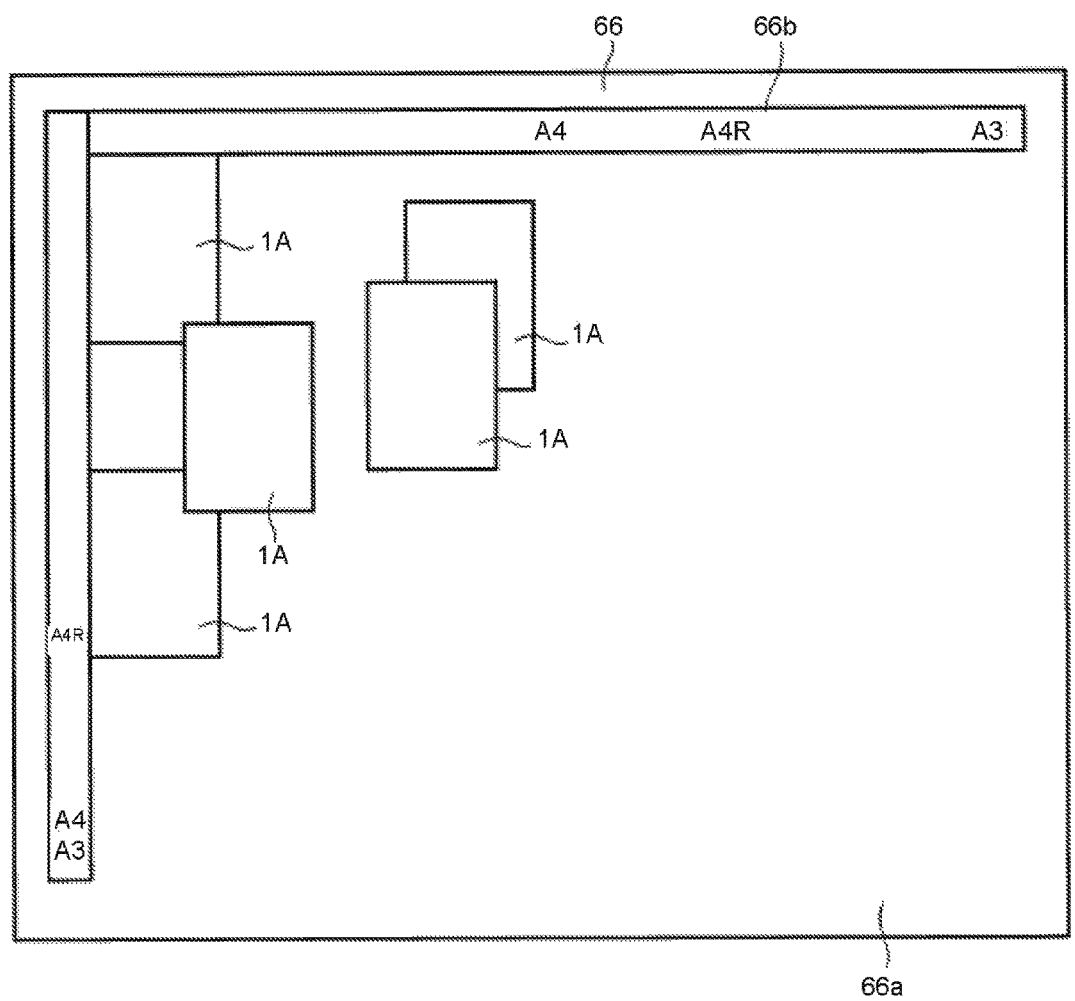
FIG. 8 is a front view illustrating the adsorption board adsorbing the original document.

FIG. 6 is a side view illustrating the upper part of the image forming apparatus 10 with the scanner cover 60 open in a state in which the locking by the lock mechanism 65 is released. FIG. 7 is a front view illustrating an adsorption board 66 adsorbing an original document 1. FIG. 8 is a front view illustrating the adsorption board 66 adsorbing a plurality of original documents 1A.

The image forming apparatus 10 has a scanning function, a copying function, and a printing function. The scanning function is a function of reading images such as characters and symbols recorded on the original document 1. The copying function is a function of printing an image scanned by the scanning function on a paper. The printing function is a function of receiving a print image to print it on the paper.

The function of the image forming apparatus 10 is not limited to the scanning function, the copying function, and the printing function. In addition to the scanning function, the image forming apparatus 10 may have at least one function. The image forming apparatus 10 may further have a facsimile function, for example.

The image forming apparatus 10 has the housing 20, a printing section 30, the scanner section 40, a first hinge 50, the scanner cover 60, and a controller 70. In the present embodiment, the scanner section 40 and the scanner cover 60 constitute an image reading apparatus of a flat head type. Herein, a front-rear direction F of the image forming apparatus 10 is defined. As an example, the front-rear direction F is defined by setting a side at which the scanner cover 60 of the housing 20 is connected as a rear side and the opposite side as a front side.

The housing 20 has, for example, a rectangular parallelepiped shape. An upper surface 21 of the housing 20 is a flat surface. An upper part 22 of the housing 20 has a document table glass 21a. The surface of the document table glass 21a constitutes a part of the upper surface 21. The document table glass 21a is transparent. As shown in FIG. 2, there is the slide rail 23 on the upper part 22 of the housing 20. As shown in FIG. 3, one slide rail 23 is arranged at each side of the document table glass 21a. As shown in FIG. 4, an upper end surface of the slide rail 23 is flush with the upper surface 21 of the housing 20. Alternatively, the upper end surface of the slide rail 23 is below the upper surface 21.

The slide rail 23 houses a roller 64 described later therein. The slide rail 23 has a groove through which the support section 63 passes at the upper part thereof. Specifically, the slide rail 23 has a bottom wall 23a, two side walls 23b, and an upper wall 23c. The upper wall 23c has a groove 23d. The groove 23d opens to the upper surface 21. The slide rail 23 guides the movement of the roller 64 accompanied with opening and closing of the scanner cover 60. The slide rail 23 is positioned in the housing 20 in such a posture that an extending direction of the slide rail 23 is parallel to the front-rear direction of the housing 20. The extending direction of the slide rail 23 is the longitudinal direction of the slide rail 23.

A width of the groove 23d has a width such that the roller 64 inside the slide rail 23 does not go to the outside through the groove 23d. In other words, the width of the groove 23d is smaller than that of the roller 64. The width of the groove 23d at the rear end of the slide rail 23 has a width through which the roller 64 can pass.

The printing section 30 is arranged in the housing 20 as shown in FIG. 1. The printing section 30 prints the image scanned by the scanner section 40 on the paper. The printing section 30 prints a print image received from a PC (Personal Computer) or the like connected to the image forming apparatus 10 on the paper.

The scanner section 40 is arranged in the housing 20. The scanner section 40 faces the document table glass 21a. The scanner section 40 scans the image of the original document 1 on the document table glass 21a.

The first hinge 50 is at a rear end of the upper peripheral part of the housing 20. The first hinge 50 connects the scanner cover 60 to the housing 20. The scanner cover 60 is rotatable around a first rotation center line C1 with respect to the housing 20 by the first hinge 50. The first rotation center line C1 is parallel to a direction orthogonal to the extending direction of the slide rail 23. In the present embodiment, the first rotation center line C1 is parallel to a left-right direction of the housing 20.

As shown in FIG. 2 and FIG. 3, the scanner cover 60 includes a cover member 61, a second hinge 62, the support section 63, the roller 64, the lock mechanism 65, the adsorption board 66, and an electric circuit 67.

The cover member 61 defines the outer shell of the scanner cover 60. The cover member 61 has, for example, a rectangular parallelepiped shape. The cover member 61 is connected to the first hinge 50. The scanner cover 60 is rotatable around the first rotation center line C1 with respect to the housing 20 between the closed position P1 indicated by a two-dot chain line in FIG. 2 and a maximum open position P2 indicated by a solid line in FIG. 2.

The closed position P1 is a position where an adsorption surface 66a of the adsorption board 66 presses the original document 1 against the document table glass 21a (a position where the original document 1 is clamped between the adsorption surface 66a and the document table glass 21a). At the closed position P1, the adsorption surface 66a contacts the document table glass 21a if the original document 1 is not placed on the document table glass 21a.

The maximum open position P2 is a position where the scanner cover 60 rotates to the maximum about the first rotation center line C1 of the first hinge 50. The maximum open position P2 is preferably a position where a work of placing the original document 1 on the document table glass 21a by a user of the image forming apparatus 10 is not hindered.

Between the closed position P1 and the maximum open position P2, there is the abutment position P3. The abutment position P3 is a position where the roller 64 in the support section 63 abuts against a front end of the slide rail 23. The abutment position P3 has slightly smaller opening degree than that of the maximum open position P2. The abutment position P3 is preferably a position where it is easy to place the original document 1 to the adsorption surface 66a of the adsorption board 66 in a state in which the locking by the lock mechanism 65 is released.

The second hinge 62 is positioned at an end opposite to the end connected to the first hinge 50 of the cover member 61. The second hinge 62 is positioned at a front end part if the cover member 61 is at the closed position P1. A second rotation center line C2 of the second hinge 62 is parallel to the first rotation center line C1 of the first hinge 50. As shown in FIG. 3, there are two second hinges 62 as an example. The second hinge 62 is positioned at a position facing the slide rail 23 at the time the scanner cover 60 of the cover member 61 is positioned at the closed position P1.

There are two support sections 63. The support section 63 has a bar shape. The support section 63 at one side is connected to the second hinge 62 at one side to be rotatable about the second rotation center line C2. The other support section 63 is connected to the second hinge 62 at the other side about the second rotation center line C2.

In the support section 63, the adsorption board 66 is fixed. Specifically, one side edge of the adsorption board 66 is fixed to the support section 63 at one side. The other side edge of the adsorption board 66 is fixed to the support section 63 at the other side. The width of the support section 63 is smaller than that of the groove 23d of the slide rail 23, as shown in FIG. 4 and FIG. 5.

Accompanied with the opening and closing of the scanner cover 60 in a state in which the locking by the lock mechanism 65 is released, the support section 63 rotates around the second rotation centerline C2 due to the weight of the support section 63 and the adsorption board 66. At this time, the support section 63 is positioned at the center in a width direction of the groove 23d of the slide rail 23. For this reason, the support section 63 does not contact the edge of the groove 23d at the time of opening or closing the scanner cover 60.

The roller 64 is positioned at an end opposite to the end connected to the second hinge 62 of the support section 63 as shown in FIG. 4. There is one roller 64 at each side in the width direction of the support section 63. A rotation center line C3 of the roller 64 is parallel to the second rotation center line C2. The roller 64 is arranged in the slide rail 23. A width from the roller 64 at one side of the support section 63 to the roller 64 at the other side of the support section 63 is greater than the width of the groove 23d. Therefore, the two rollers 64 prevent the support section 63 from coming off from the inside of the slide rail 23.

The support section 63 has such a length that an opening operation of the scanner cover 60 is not hindered due to contact between the roller 64 and the upper wall 23c of the slide rail 23 in the process of opening the scanner cover 60 from the closed position P1 to the maximum open position P2.

As shown in FIG. 2 and FIG. 5, the lock mechanism 65 is fixed to the cover member 61 to be capable of detaching or attaching the support section 63. The lock mechanism 65 detachably fixes an end opposite to the end connected to the second hinge 62 of the support section 63 to the cover member 61 as an example. The lock mechanism 65 is operated by the user of the image forming apparatus 10. The lock mechanism 65 has, by way of example, a first engagement section 65a in the support section 63 and a second engagement section 65b in the cover member 61 as shown in FIG. 6.

The first engagement section 65a is engaged with the second engagement section 65b. The first engagement section 65a is, for example, a nail shape. The second engagement section 65b is operable by the user of the image forming apparatus 10. The second engagement section 65b moves at a position where the second engagement section 65b is engaged with the first engagement section 65a and a position where the engagement with the first engagement section 65a is released. The movement of the second engagement section 65b is executed by the user of the image forming apparatus 10. The second engagement section 65b also functions as an operation section operated by the user of the image forming apparatus 10.

If the first engagement section 65a is engaged with the second engagement section 65b, the lock mechanism 65 is in a state in which the support section 63 is fixed to the cover member 61. In this state, the lock mechanism 65 locks the support section 63. In a case in which the lock mechanism 65 locks the support section 63, even if the scanner cover 60 rotates about the first hinge 50 as shown in FIG. 2, the support section 63 is fixed to the cover member 61 without rotating about the second hinge 62.

If the second engagement section 65b is operated and the engagement of the first engagement section 65a and the second engagement section 65b is released, the locking of the support section 63 by the lock mechanism 65 is released. If the scanner cover 60 rotates about the first hinge 50 with the locking of the support section 63 by the lock mechanism 65 released, the support section 63 rotates about the second hinge 62 by the weight of the support section 63 and the adsorption board 66 fixed in the support section 63.

The lock mechanism 65 is capable of transmitting a signal to the controller 70 in a state in which the locking of the support section 63 is released. In the present embodiment, the second engagement section 65b has a function of transmitting the signal to the controller 70 if the second engagement section 65b is positioned at a position where the second engagement section 65b is not engaged with the first engagement section 65a. In this way, the second engagement section 65b functions as a switch for switching the locked state and release of the locked state of the support section 63 by the lock mechanism 65 and functions as a detection section that detects the state in which the locking of the support section 63 by the lock mechanism 65 is released and transmits a signal.

The adsorption board 66, by way of example, is an electrostatic adsorption board. The adsorption board 66 has the adsorption surface 66a. The adsorption board 66 adsorbs the original document 1 to the adsorption surface 66a by being electrostatically charged. The adsorption board 66 is connected to an electric circuit 67. The adsorption board 66 is electrostatically charged by a current supplied from the electric circuit 67.

The adsorption board 66 is fixed to the support section 63 in such a manner that the adsorption surface 66a can clamp the original document 1 with the document table glass 21a if the scanner cover 60 is positioned at the closed position P1. In the present embodiment, the adsorption board 66 is connected to the cover member 61 via the support section 63 to be rotatable around the second rotation center line.

The adsorption board 66 is selectively fixed to the cover member 61 by the lock mechanism 65 via the support section 63. In the state in which the support section 63 is locked by the lock mechanism 65, the adsorption board 66 is fixed at a clamping position P5 where the adsorption surface 66a and the document table glass 21a can clamp the original document 1 if the scanner cover 60 is positioned at the closed position P1.

The adsorption board 66 is rotatable in a direction in which the adsorption surface 66a moves away from the first rotation center line C1 with respect to the clamping position P5 and in the opposite direction thereof around the second rotation center line C2 via the support section 63.

In other words, if the locking of the support section 63 by the lock mechanism 65 is released, the adsorption board 66 is rotatable between the clamping position P5 and a position where the adsorption surface 66a moves in a direction away from the first rotation center line C1 with respect to the clamping position P5.

As shown in FIG. 7, the adsorption surface 66a has a scale 66b. The scale 66b indicates a placing position of the original document. Specifically, the scale 66b has a mark for placing the original document of A4 size and a mark for placing the original document of A3 size. The adsorption board 66 opposes the document table glass 21a if the scanner cover 60 is positioned at the closed position P1. The adsorption board 66 and the document table glass 21a clamp the original document 1 if the scanner cover 60 is positioned at the closed position P1.

As shown in FIG. 2, the electric circuit 67 is, by way of example, arranged in the cover member 61. A part of wiring 67a connecting the electric circuit 67 to the adsorption board 66 is, for example, arranged in the second hinge 62. The current supplied to the adsorption board 66 by the electric circuit 67 is set to the extent that the adsorption board 66 can adsorb the original document 1 by static electricity.

The controller 70 controls the operation of the image forming apparatus 10. The controller 70 controls the electric circuit 67 according to the state of the lock mechanism 65. The state of the lock mechanism 65 includes a state (FIG. 2) in which the lock mechanism 65 locks the support section 63 and a state (FIG. 6) in which the locking of the support section 63 by the lock mechanism 65 is released.

In the present embodiment, the second engagement section 65b continues to send the signal to the controller 70 if the second engagement section 65b is positioned at a position where the second engagement section 65b is not engaged with the first engagement section 65a. The controller 70 determines that a period in which the signal from the second engagement section 65b is received is a state in which the locking of the support section 63 by the lock mechanism 65 is released. If the controller 70 determines that the locking of the support section 63 by the lock mechanism 65 is released by, the controller 70 controls (drives) the electric circuit 67 to conduct the current to the adsorption board 66.

Next, the operation of the image forming apparatus 10 is described. If the user of the image forming apparatus 10 copies the original document 1 or reads symbols such as characters or pictures recorded in the original document 1, the original document 1 is placed on the document table glass 21a. There are two methods to place the original document 1 on the document table glass 21a. The first method is that the user places the original document 1 directly on the document table glass 21a. The second method is to use the adsorption board 66 to place the original document 1 on the document table glass 21a.

If the user places the original document 1 on the document table glass 21a by the first method, the support section 63 is fixed to the cover member 61. In other words, the first engagement section 65a of the support section 63 is in a state of being engaged with the second engagement section 65b of the cover member 61. The lock mechanism 65 locks the support section 63.

In the locked state, the lock mechanism 65 fixes the support section 63 to the cover member 61. Therefore, as shown in FIG. 2, the support section 63 and the adsorption board 66 do not rotate about the second hinge 62 even if the scanner cover 60 is positioned at the maximum open position P2. Since the controller 70 does not receive the signal from the second engagement section 65b in a state in which the lock mechanism 65 locks the support section 63, the controller 70 does not conduct the current from the electric circuit 67 to the adsorption board 66.

The user opens the scanner cover 60 to the maximum open position P2. If the scanner cover 60 is rotated in an opening direction from the closed position P1 with the support section 63 locked by the lock mechanism 65, the roller 64 passes through the groove 23d at the rear end of the slide rail 23. The groove 23d at the rear end of the slide rail 23 has a width through which the support section 63 and the two rollers 64 can pass as described above.

Therefore, the scanner cover 60 can be rotated in the opening direction from the closed position P1 even if the support section 63 is locked by the lock mechanism 65. If the user opens the scanner cover 60 to the maximum open position P2, the user places the original document 1 on the document table glass 21a. The user places the original document 1 on the document table glass 21a in such a posture that a surface read by the scanner section 40 faces the document table glass 21a.

Alternatively, if the user places the original document 1 on the document table glass 21a via the adsorption board 66 by the second method, the locking of the support section 63 by the lock mechanism 65 is released. Specifically, the user operates the second engagement section 65b to move the second engagement section 65b to a position where the engagement with the first engagement section 65a is released. The second engagement section 65b sends the signal to the controller 70 while the second engagement section 65b is positioned at the position where the second engagement section 65b is not engaged with the first engagement section 65a.

If the signal is received from the second engagement section 65b, the controller 70 determines that the locked state of the support section 63 by the lock mechanism 65 is released, and controls the electric circuit 67 to conduct the current to the adsorption board 66. The adsorption board 66 is electrostatically charged as the current flows.

If the locked state of the support section 63 by the lock mechanism 65 is released, the support section 63 is freely rotatable around the second hinge 62 with respect to the cover member 61. Therefore, if the user opens the scanner cover 60 from the closed position P1 while the locked state of the support section 63 by the lock mechanism. 65 is released as shown in FIG. 6, an integral constitution of the support section 63 and the adsorption board 66 rotates around the second hinge 62 by the weight of the support section 63 and the adsorption board 66.

If the support section 63 and the adsorption board 66 rotate about the second hinge 62, the roller 64 moves in the slide rail 23. In the process in which the scanner cover 60 rotates from the closed position P1 toward the maximum open position P2, the roller 64 moves toward the front end of the slide rail 23.

In the present embodiment, if the scanner cover 60 is opened to the maximum open position P2, the support section 63 and the adsorption board 66 are parallel in an up-down direction. In the present embodiment, the slide rail 23 extends forward with respect to the roller 64 in a state in which the scanner cover 60 is opened to the maximum open position P2.

If the scanner cover 60 opens to the maximum open position P2, the user moves the support section 63 and the adsorption board 66 to the front of the housing 20 by pulling them by hand. If the user moves the adsorption board 66 and the support section 63 to the front of the housing 20, the roller 64 moves to the front end of the slide rail 23.

The roller 64 abuts against the front end of the slide rail 23, and in this way, the scanner cover 60 is closed from the maximum open position P2 to the abutment position P3. At the abutment position P3, the scanner cover 60 is fixed by abutment of the roller 64 against the front end of the slide rail 23.

If the user opens the scanner cover 60 to the abutment position P3, the original document 1 is attached to the adsorption board 66 in a posture in which the surface read by the scanner section 40 faces a front surface. If the original document 1 is attached to the adsorption surface 66a, the adsorption surface 66a adsorbs the original document 1. If the user places the original document 1 to the adsorption board 66, the user closes the scanner cover 60 to the closed position P1. Specifically, the user opens the scanner cover 60 at the abutment position P3 to the maximum open position P2. If the scanner cover 60 is opened to the maximum open position P2, the support section 63 and the adsorption board 66 are parallel to each other in the up-down direction. The roller 64 moves backward from the front end of the slide rail 23.

Next, the user closes the scanner cover 60 to the closed position P1. Since the roller 64 moves backward from the front end of the slide rail 23, the scanner cover 60 is closed at the closed position P1.

In the present embodiment, if the original document 1 is placed on the document table glass 21a using the adsorption board 66, the original document 1 is attached to the adsorption board 66 rotating around the second hinge 62 until the front of the user present in front of the housing 20. As the attached original document 1 is adsorbed to the adsorption surface 66a, the deviation of the position of the original document 1 on the document table glass 21a due to the opening and closing of the scanner cover 60 is prevented.

In addition, the user can attach the original document 1 at the proper position according to the scale 66b of the adsorption surface 66a. Furthermore, as shown in FIG. 8, an original document 1A of a small size can be placed within a desired original size by the scale 66b. FIG. 8 shows an example in which a plurality of the original documents 1A having sizes smaller than the A4 size is arranged within the range of reading the original document of the A4 size.

Furthermore, in the present embodiment, the adsorption board 66 is rotated about the second hinge 62 if the scanner cover 60 is opened in a state in which the locking of the support section 63 by the lock mechanism. 65 is released. The adsorption board 66 rotates about the second hinge 62, and in this way, the adsorption surface 66a of the adsorption board 66 faces the user, so that the user can easily attach the original document 1 to the adsorption surface 66a.

Furthermore, the controller 70 controls the electric circuit 67 to conduct the current to the adsorption board 66 if the locking of the support section 63 by the lock mechanism 65 is released. As the current flows to the adsorption board 66 only if the user uses the adsorption board 66, the electricity can be saved.

In the present embodiment, the adsorption board 66 adsorbs the original document 1 by being electrostatically charged. As a structure for adsorbing the original document 1, a structure other than a structure utilizing the static electricity may be used. As a structure for adsorbing the original document 1 by a means other than static electricity, there is a structure for adsorbing the original document 1 by using negative pressure.

Figure 9:
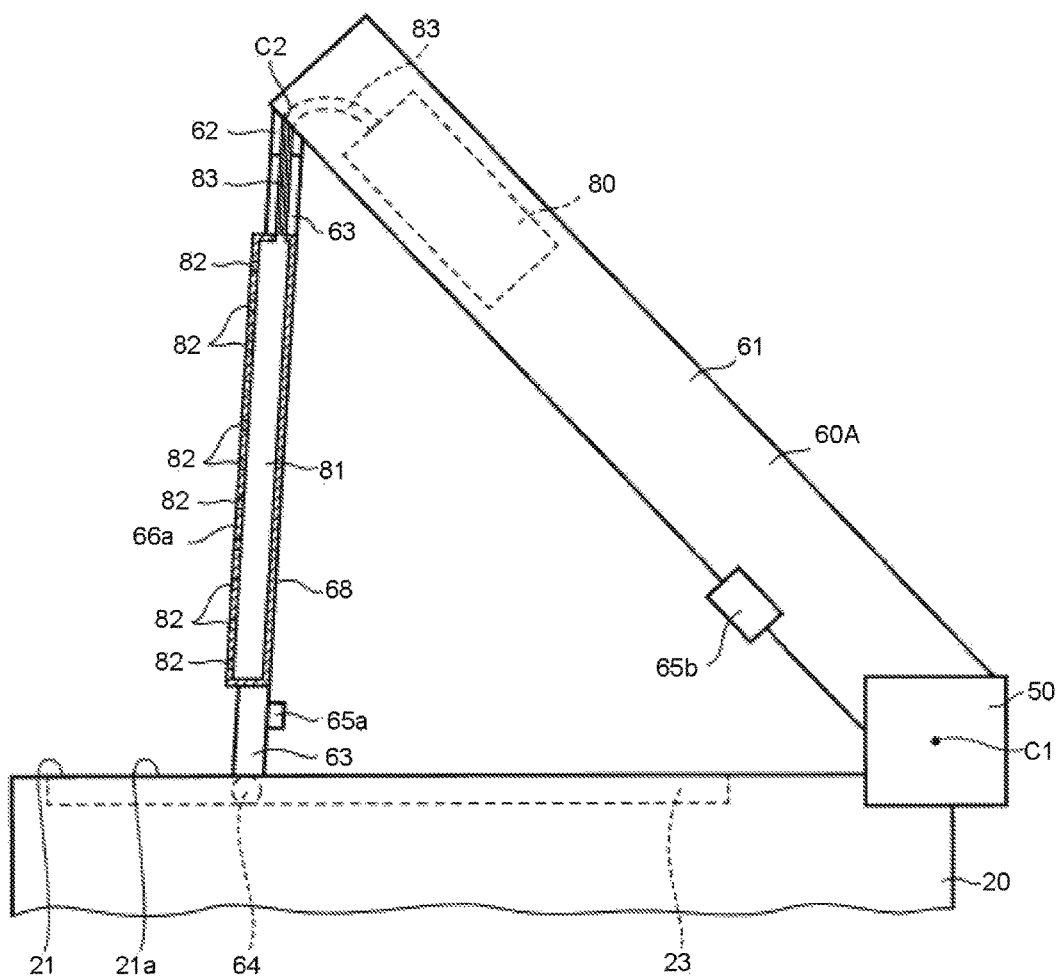
FIG. 9 is a side view of a modification of the scanner cover that is partially cut out.

FIG. 9 is a side view illustrating a scanner cover 60A partially cut out with an adsorption board 68 which adsorbs the original document 1 using negative pressure. The structure of the modification other than the scanner cover 60A is the same as that in the first embodiment. FIG. 9 shows a state in which the adsorption board 68 is cut along a cutting plane orthogonal to the second rotation center line C2 of the second hinge 62. In the scanner cover 60A, the component having the same function as that in the scanner cover 60 is denoted by the same reference numeral as that of the scanner cover 60, and a description thereof is omitted.

As shown in FIG. 9, the scanner cover 60A has the cover member 61, the second hinge 62, the support section 63, the lock mechanism 65, the adsorption board 68, and a pump 80. The adsorption board 68 has a cavity 81 therein. An adsorption surface 66a of the adsorption board 68 has a plurality of holes 82 communicating with the cavity 81.

The pump 80 is connected to a piping 83. The piping 83 is connected to the adsorption board 68. The piping 83 communicates with the cavity 81. The piping 83 is arranged in the second hinge 62. The pump 80 generates the negative pressure. If the pump 80 is driven, the negative pressure is generated in the hole 82. The pump 80 is controlled by the controller 70. In a state in which the locking of the support section 63 by the lock mechanism 65 is released, the controller 70 drives the pump 80 to generate the negative pressure in the hole 82.

If the original document 1 is placed on the adsorption board 68, as the original document 1 blocks the hole 82, the negative pressure acting on the hole 82 fixes the original document 1 to the adsorption surface 66a. The negative pressure acting on the hole 82 may be a negative pressure capable of fixing the original document 1 to the adsorption board 68.

Alternatively, the adsorption board 66 may have both the structure that fixes the original document 1 by static electricity and the structure that fixes the original document 1 by the negative pressure. Alternatively, the adsorption board 66 may have adhesiveness to adsorb the original document 1 by an adhesive force, but not the static electricity or the negative pressure.

In the present embodiment, the adsorption board 66 is connected to the second hinge 62 via the support section 63. However, the adsorption board 66 is not limited to being connected to the second hinge 62 via the support section 63. In another example, the adsorption board 66 may be connected directly to the second hinge 62. In the present embodiment, the roller 64 is supported on the adsorption board 66 via the support section 63. In another example, the roller 64 may be supported directly on the adsorption board 66.

In the present embodiment, the lock mechanism 65 locks the adsorption board 66 by locking the support section 63.

If the adsorption board 66 is directly connected to the second hinge 62 without using the support section 63, the lock mechanism 65 may selectively lock the adsorption board 66 to the cover member 61.

In the present embodiment, the lock mechanism 65 has the first engagement section 65a at the adsorption board 66 side and the second engagement section 65b at the cover member 61 side. By operating the second engagement section 65b, the engagement of the first engagement section 65a and the second engagement section 65b is released. By operating the second engagement section 65b, fixation of the adsorption board 66 to the cover member 61 by the lock mechanism 65 is released.

However, the lock mechanism 65 is not limited to a structure having the first engagement section 65a and the second engagement section 65b. The lock mechanism 65 may be any structure as long as the adsorption board 66 can be locked so that it does not rotate around the second hinge 62 and the locked state thereof can be released by an operation by the user. Furthermore, the lock mechanism 65 may be any structure as long as it is capable of transmitting the signal to the controller 70 with the locking of the adsorption board 66 released.

In the present embodiment, the lock mechanism 65 sends the signal to the controller 70 in a state in which the locking of the adsorption board 66 to the cover member 61 is released. The lock mechanism 65 may send a signal to the controller 70 if the adsorption board 66 is fixed to the cover member 61 (locked state), and may not send the signal in a state in which the adsorption board 66 is not fixed to the cover member 61 (a state in which the locking is released). In this case, the controller 70 determines that the state in which the signal is not received is a state in which the locking state of the adsorption board 66 by the lock mechanism 65 is released, and drives the electric circuit 67 or the pump 80. Alternatively, the lock mechanism 65 may transmit different signals depending on a state in which the adsorption board 66 is fixed to the cover member 61 and a state in which the adsorption board 66 is not fixed to the cover member 61. In response to the signal, the controller detects the fixed state and the unfixed state of the adsorption board 66 to the cover member 61 by the lock mechanism 65.

In essence, based on the signal from a signal transmission section for sending the signal depending on the fixed state of the adsorption board 66 to the cover member 61 by the lock mechanism 65 and the unfixed state thereof, the controller 70 can determine that the fixing of the adsorption board 66 to the cover member 61 by the lock mechanism 65 is released.

In the present embodiment, the second engagement section 65b of the lock mechanism 65 functions as the switching for switching a signal transmission state and a non-transmission state. However, as the signal transmission section for transmitting the signal depending on the fixed state of the adsorption board 66 to the cover member 61 by the lock mechanism 65 and the unfixed state thereof, a sensor may be used to detect the state in which the first engagement section 65a and the second engagement section 65b are not engaged with each other.

In the present embodiment, the electric circuit 67 is arranged in the cover member 61. In another example, the electric circuit 67 may be arranged in the housing 20. The pump 80 is arranged in the cover member 61. In another example, the pump 80 may be arranged in the housing 20.

In the present embodiment, the slide rail 23 movably supports the roller 64 by housing the roller 64 therein. However, the slide rail 23 is not limited to the shape in which the roller 64 is housed.

In the present embodiment, the cover member 61 of the scanner cover 60 is connected to the housing 20 by the first hinge 50 to be rotatable around the first rotation center line C1. However, the scanner cover 60 is not limited to being connected to the housing 20 by the first hinge 50 which is a separate member from the scanner cover 60 and the housing 20. In another example, a part of the cover member 61 of the scanner cover 60 may be connected to the housing 20 to be rotatable around the first rotation center line C1. The cover member 61 has a structure similar to a part of the first hinge 50, the housing 20 has a structure similar to a part of the first hinge 50, and they may be rotatably connected.

In the present embodiment, the support section 63 is connected to the cover member 61 by the second hinge 62 to be rotatable around the second rotation center line C2. However, the support section 63 is not limited to being connected to the cover member 61 by the second hinge 62 which is separate from the support section 63 and the cover member 61. In another example, a part of the cover member 61 may be connected to the support section 63 to be rotatable around the second rotation center line C2. The cover member 61 has a structure similar to a part of the second hinge 62, the support section 63 has a structure similar to a part of the second hinge 62, and they may be rotatably connected.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image reading apparatus, comprising:
   a housing having a document table glass;
   a scanner device, arranged in the housing, configured to read an original document on the document table glass;
   a cover configured to be connected to the housing to be rotatable around a first rotation center line with respect to the housing between a closed position where the document table glass is covered and an open position;
   an adsorption board, arranged in a part at a housing side at the time the cover is positioned at the closed position, configured to have an adsorption surface adsorbing the original document, and be connected to the cover to be rotatable around a second rotation center line parallel to the first rotation center line between a clamping position at which the original document is clamped between the adsorption surface and the document table glass at the time the cover is positioned at the closed position and a movement position at which the adsorption surface moves in a direction away from the first rotation center line with respect to the clamping position; and
   an electric circuit that controls adsorption of the original document on the adsorption surface of the adsorption board.

2. The image reading apparatus according to claim 1, further comprising:
   a slide rail arranged in the housing configured to extend in parallel with a direction orthogonal to the first rotation center line; and
   a roller arranged in the adsorption board configured to be movably supported on the slide rail.

3. The image reading apparatus according to claim 1, wherein
   the adsorption board is an electrostatic adsorption board, and
   the electric circuit conducts current to the adsorption board.

4. The image reading apparatus according to claim 1, wherein
   the adsorption surface of the adsorption board has a plurality of holes, and
   the electric circuit controls a pump that applies a negative pressure to a hole of the plurality of holes.

5. The image reading apparatus according to claim 1, further comprising:
   a locking device capable of selectively fixing the adsorption board to the cover at the clamping position; and
   a signal transmission device configured to transmit a signal depending to a state in which the adsorption board is fixed to the cover by the locking device and a state in which fixation is released, wherein
   in response to determining that the fixation of the adsorption board to the cover by the locking device is released based on the signal, the electric circuit controls performance of the adsorption of the original document on the adsorption surface of the adsorption board.

6. An image forming apparatus, comprising:
   a housing having a document table glass;
   a scanner device, arranged in the housing, configured to read an original document on the document table glass;
   a cover configured to be connected to the housing to be rotatable around a first rotation center line with respect to the housing between a closed position where the document table glass is covered and an open position;
   an adsorption board, arranged in a part at a housing side at the time the cover is positioned at the closed position, configured to have an adsorption surface adsorbing the original document, and be connected to the cover to be rotatable around a second rotation center line parallel to the first rotation center line between a clamping position at which the original document can be clamped between the adsorption surface and the document table glass at the time the cover is positioned at the closed position and a movement position at which the adsorption surface moves in a direction away from the first rotation center line with respect to the clamping position; and
   an electric circuit the controls adsorption of the original document on the adsorption surface of the adsorption board.

\* \* \* \* \*